Feb. 17, 1925.

F. S. FROST 1,526,471

MILKING MACHINE

Filed Feb. 5, 1921

2 Sheets-Sheet 1

Inventor
Frank S. Frost
By Miller Chindahl & Barker
Attys

Feb. 17, 1925.

F. S. FROST

MILKING MACHINE

Filed Feb. 5, 1921  2 Sheets-Sheet 2

1,526,471

Inventor
Frank S. Frost
By Miller Chindahl & Parker
Attys

Patented Feb. 17, 1925.

1,526,471

UNITED STATES PATENT OFFICE.

FRANK S. FROST, OF CHICAGO, ILLINOIS, ASSIGNOR TO SEARS, ROEBUCK AND CO., OF CHICAGO, ILLINOIS, A CORPORATION OF NEW YORK.

MILKING MACHINE.

Application filed February 5, 1921. Serial No. 442,612.

*To all whom it may concern:*

Be it known that I, FRANK S. FROST, a citizen of the United States, residing at Chicago, in the county of Cook and State of Illinois, have invented certain new and useful Improvements in Milking Machines, of which the following is a specification.

My invention relates to the art of milking mechanically and more particularly to an improved outfit embodying in a unitary device all the essential elements of a complete milking apparatus.

One object of my invention is to provide a separator between the milking apparatus proper and the exhausting means.

Another object is to provide a separator that may be readily taken apart and readily cleansed.

Another object is to provide a separator in which the parts when in use are held in place by the suction within the separator.

Another object is to provide for the safety of the animal by imposing a limit on the vacuum which it is possible to apply to the teats of the animal, said limit being independent of the operator.

Another object is to provide a portable, self-contained and complete apparatus for milking by power.

Another object is to provide a portable milking apparatus driven by an electric motor forming part of the portable apparatus.

Further objects and advantages of my invention will become apparent as the description proceeds.

Figure 1:
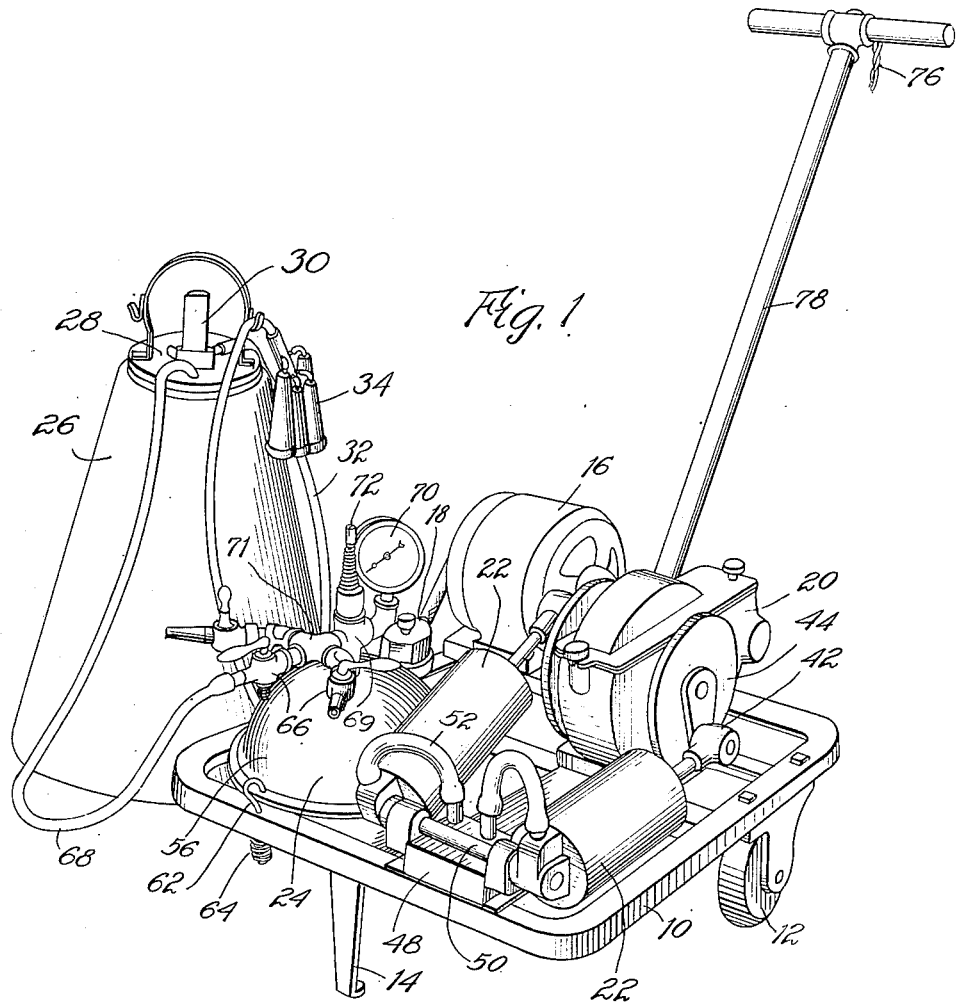
Figure 2:
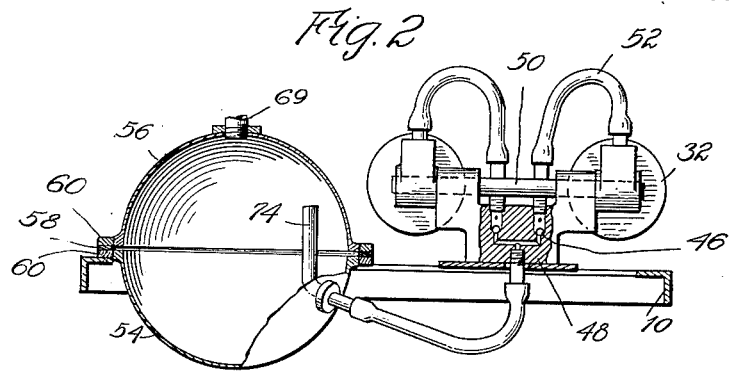
Figure 3:
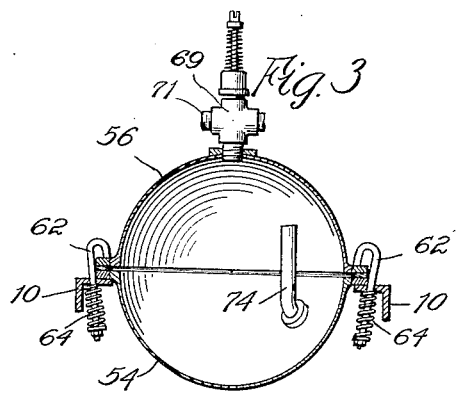
Figure 4:
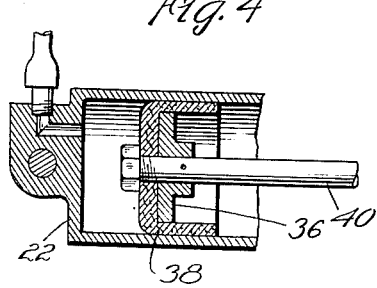

In the accompanying drawings, Figure 1 is a perspective view of a complete apparatus. Fig. 2 shows the exhausting means in end view and partly in section and the connection between the same and the separator. Fig. 3 is a sectional view of the combined separator and storage reservoir and Fig. 4 is a detail section through one of the pumps comprising the exhausting means.

In the embodiment of my invention selected for illustration a small truck frame 10 is carried by wheels 12, one at each side of the frame near one end and a shoe or foot 14 in the middle of the end farthest from the wheels. The frame supports an electric motor 16, a switch 18 for controlling the same, reduction gearing within a housing 20 forming a transmission from the electric motor to the pump cylinders 22, a combined separator and storage reservoir 24 and suitable connections between the same and the pump cylinders, and connections carried by the separator for connecting the same to the milking apparatus proper.

The milking apparatus proper comprises in this instance one or more pails 26 for receiving the milk, each pail having a removable cover 28 upon which a pulsator 30 is mounted which may be operated by the suction within the pail to intermittently deliver suction to the tube 32 leading to the cluster of teat cups 34. As the specific type of milking apparatus proper employed is immaterial so far as my present invention is concerned, detailed description of the same is deemed unnecessary.

The exhausting means I have illustrated comprises two pump cylinders 22 each housing a simple piston 36 having a leather washer 38, said pistons being driven by means of connecting rods 40 extending to crank pins 42 carried by rotating disks 44 on either side of the casing 20 housing the reduction gearing. The pins on the disks 44 are properly spaced to operate the two pistons alternately and produce a sufficiently uniform suction in the connecting tubes leading from the pump. Any suitable check valve may be employed in connection with each of the pump cylinders. I have illustrated ball check valves 46 housed in the same supporting block 48 which supports shaft 50 to provide a pivotal mounting for each of the pump cylinders 22.

By reason of the fact that the check valves are located at a point spaced from the pump cylinder by connecting tubes 52 and by reason of the fact that the pistons 36 do not move to the extreme bottom of the cylinders, stopping at the end of the stroke at some such point as shown in Fig. 4, a rather definite predetermined limit is imposed upon the vacuum it is possible to develop with the apparatus. The parts may readily be designed so that it is impossible to develop a greater vacuum than can safely be applied to the teats of the animal without injury, which amount of vacuum is approximately that represented by a column of mercury sixteen inches in height.

My improved primary storage reservoir and separator comprises in this instance two hemispherical metal shells 54 and 56 of which the lower shell 54 is fixedly mounted on the frame 10. The upper shell 56 carries the connections for connecting to the milking apparatus proper and when in use is simply laid in place on the lower portion, a rubber gasket 58 being preferably placed between the flanges 60 to form a tight joint. Hook shaped bolts 62 are also provided and may be slipped over the flange of the upper shell 56 as shown in Fig. 3, in which position the force of compression springs 64 will hold the upper shell 56 in place to prevent its accidental displacement when there is no suction in the separator, and especially when the apparatus is being moved from place to place.

The connections carried by the upper shell 56 comprise a plurality of branching stop cocks 66, which by means of rubber tubes 68 may be connected to one or more sets of milking apparatus. A vacuum gage 70 is also provided and an adjustable suction relief valve 72 which may readily be adjusted by the operator to maintain any desired vacuum within the separator. A simple arrangement of fittings comprising almost entirely simple standard parts is employed for these connections. As shown in Fig. 1 a cross 69 is mounted on the shell 56 with the gage 70 connected to one of its horizontal openings, the relief valve 72 to the vertical opening, and another cross 71 to the other horizontal opening. This last cross 71 carries the stop cocks 66, two of which are bent so as to project at a convenient angle for the attachment of the tubes 68. The relief valve 72 might obviously be adjusted to permit the development of such a high vacuum as to injure the teats of the animal, but this possibility is eliminated as above pointed out by so designing the exhausting means that it is incapable of producing such high vacuums.

The warm milk drawn from the animal and filling the pail 26 in which there is a vacuum, will give off more or less vapor or spray which fills the space within the pail and is carried through the tube 68 and connections 66 into the separator. This action is quite pronounced in most instances because ordinarily the pulsator 30 intermittently admits a small amount of air to the tube 32 to relieve the suction on the teat and this air must pass into the pail at the beginning of each suction period, so that a continuous flow through tube 68 results. If no separator were provided, this vapor would condense and collect at various points along the system of tubes and would be carried into and through the check valves 46 and into the cylinders 22 or other exhausting apparatus. This condensed vapor is animal matter and is apt to decay and putrefy when allowed to remain in the apparatus for any length of time, causing bad odors and an unsanitary condition, and when pumps with leather washers are employed, as well as rubber connecting tubes, the leather and the rubber of the tubes will be coated with foul material.

The inlet to my improved separator is centrally located at the top of the upper shell 56 and an outlet tube 74 is provided, opening upward at one side near the top of the separator. The vapor-charged gas entering the inlet will therefore form a current expanding and coming practically to rest in the lower portion of the separator so that the vapor may settle and collect on the walls of the separator and thus be prevented from passing on to contaminate other parts of the apparatus. Whenever there is no suction, i. e. whenever the device is not in use, the upper shell 56 of the separator may be simply lifted off after swinging bolts 62 out of operative position, exposing the entire interior which presents a smooth, uniform surface and may be readily swabbed out and, if desired, sterilized with a little hot water.

Power may be delivered to the electric motor under the control of switch 18 by an extension cord 76 which may run down the interior of the handle 78 used for moving the apparatus from place to place.

It will be seen that I have provided a compact unitary apparatus embodying in simple and practical form the various novel features involved. While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:—

1. In a milking apparatus, the combination of an exhausting means, a milking means having suction line connections therewith to be operated thereby, and a separator reservoir in said suction line comprising sections separable for the purposes of emptying and cleaning and adapted in operation to be held together by the reduction in pressure produced therein.

2. In a milking apparatus, the combination of an exhausting means, milking means having suction line connections therewith for operation thereby, and a separator reservoir in said suction line comprising two superimposed sections separable for the purposes of emptying and cleaning and prevented from accidental displacement when said apparatus is not in operation but adapted in operation to be held together by the reduction in pressure produced therein.

In testimony whereof, I have hereunto set my hand.

FRANK S. FROST.